United States Patent Office 3,190,889
Patented June 22, 1965

3,190,889
1-SUBSTITUTED-3-INDOLYL ALIPHATIC ACIDS
Tsung-Ying Shen, Westfield, N.J., assignor to Merck & Co., Inc., Rahway, N.J., a corporation of New Jersey
No Drawing. Filed June 6, 1963, Ser. No. 285,909
11 Claims. (Cl. 260—319)

This invention relates to new chemical compounds. More particularly, it relates to a new class of compounds of the indole series and to the synthesis of such compounds. Still more particualrly, it is concerned with new α-(3-indolyl)aliphatic acids having a —CO—Y—A radical attached to the nitrogen atom of the indole ring, the symbols Y and A being more fully described hereinbelow. The invention is concerned further with novel salts, esters and amide derivatives of such compounds.

The novel chemical compounds of this invention may be represented by the general structural formula:

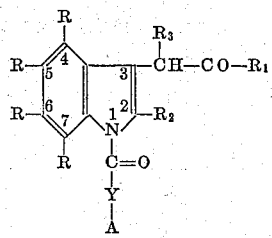

wherein
R is a member selected from the group consisting of hydrogen and halogen atoms, and lower alkyl, lower alkoxy, haloalkyl, hydroxy, aryl, aryloxy, aralkyloxy, alkenyloxy, alkynyloxy, cyloalkoxy, cycloalkylalkoxy, nitro, cyano, amino, substituted amino, aminoalkyl, substituted aminoalkyl, mercapto, lower alkylthio, benzylthio, alkylsulfonamido, dialkylsulfonamido and lower alkyl sulfonyl radicals;
$R_1$ is a member selected from the group consisting of hydroxy, lower alkoxy, dialkylaminoalkoxy, aralkoxy, —$NH_2$, substituted —$NH_2$, amine salts, and —OM radicals, said M being a cation;
$R_2$ is a member selected from the group consisting of a hydrogen atom and a hydrocarbon radical having less than nine carbon atoms;
$R_3$ is a member selected from the group consisting of a hydrogen atom and lower alkyl, aralkyl and alkenyl radicals;
Y is a member selected from the group consisting of divalent oxygen and sulfur atoms and a trivalent nitrogen atom, in the latter case said nitrogen atom having a member selected from the class consisting of a hydrogen atom and a hydrocarbon radical having less than nine carbon atoms attached to it; and
A is a member selected from the group consisting of aryl, substituted aryl, heteroaryl and substituted heteroaryl radicals.

For purposes of convenience, the foregoing compounds, which may be conveniently described as α-(3-indolyl)aliphatic acids and derivatives thereof that are acylated in the N–1 position of the indole ring with a —CO—Y—A radical, may be classified into two groups:

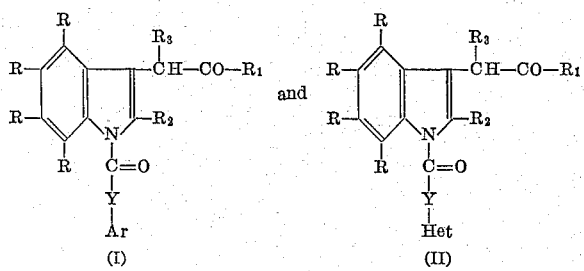

wherein R, $R_1$, $R_2$, $R_3$ and Y are as described above, and, in Class I, the symbol "Ar" represents an aryl radical consisting of, preferably, less than three fused rings, and, in Class II, the symbol "Het" represents a monocyclic heteroaryl radical. These aryl and heteroaryl radicals may be further substituted in the aromatic rings thereof with hydrocarbon groups or with functional substituents. Among the preferred hydrocarbon groups that are operable herein are those containing up to nine carbon atoms, including such radicals as phenyl, benzyl, tolyl, and the lower alkyls, such as, for example, methyl, ethyl, isopropyl, tertiary butyl and the like. The term, "functional substituent," as used herein, means one other than hydrogen or hydrocarbon.

Among the suitable aryl (Ar) components that are operable herein are the phenyl and naphthyl radicals. The aromatic rings of such groups may contain, and in the preferred compounds do contain, at least one functional substituent. This substituent may be a hydroxy or an etherified hydroxy (hydrocarbonoxy) group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like. Said functional substituent may also be a nitro group, a halogen, such as chlorine, bromine, fluorine or iodine, an amino group or a substituted amino group, representative examples of which that might be mentioned are acylamino, amineoxide, urethanes, lower alkylamino, lower dialkylamino, amidine, acylated amidines, hydrazine or a substituted hydrazine, alkoxyamines and sulfonated amines. Furthermore, said functional substituent may be a mercapto or a substituted mercapto radical of the type exemplified by alkylthio groups such as methylthio, ethylthio, and propylthio and arylthio or aralkylthio groups, e.g., benzylthio and phenylthio. The aryl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aryl radical contains a sulfamyl, benzylthiomethyl, cyano, sulfonamido, or dialkylsulfonamido radical. Further, it may contain a carboxy substituent, or a derivative thereof, such as an alkali metal salt or a lower alkyl ester of the carboxy radical, an aldehyde, amide, hydrazide and the like, or an aldehyde derivative of the type represented by acetals or thioacetals. In the preferred compounds, the Ar radical is phenyl and the functional substituent is in the para position of the aromatic ring.

It should be stressed that functional groups other than those specifically referred to above may be present in the aryl (Ar) component of the compounds of this invention, said invention being one that contemplates functional groups broadly in this portion of the molecule. Furthermore, when said aryl component is polysubstituted, the substituents may be the same or different, the only limitation being that imposed by the methods available for introducing various types of groupings into the aromatic moiety.

Among the preferred heteroaryl (Het) components that are operable herein are those consisting of five- and six-membered heteroaromatic rings. Examples of such radicals are the furyl, thienyl, pyrryl, thiazoyl, thiadiazolyl, pyrazinyl, pyridyl, alkylpyridyl, pyrazolyl, imidazolyl, oxazolyl, pyrimidinyl and isoxazolyl rings. Said heteroaryl radicals may be further substituted in the aromatic rings thereof with the heretofore described hydrocarbon groups and functional substituents.

A critical feature of the compounds of this invention is the presence of an oxygen, sulfur or nitrogen atom, that is, the Y component of the formulas herein, between the aryl or heteroaryl group and the carbonyl group attached to the indole nitrogen atom. In the case of the nitrogen atom, the remaining tertiary bond thereof is attached to either a hydrogen atom or a hydrocarbon radical having less than nine carbon atoms, such as alkyl radicals, for example, methyl, ethyl, propyl, butyl and the like, aryl and alkaryl radicals, for example, phenyl, tolyl and the like, aralkyl radicals, for example, benzyl, phenylethyl and the like, and cycloalkyl radicals, for example, cyclohexyl, cyclopentyl and the like.

The substituents represented by R in the foregoing formulae, which may be the same or different throughout the four positions indicated on the benzene portion of the indole nucleus, are, preferably, hydrogen atoms or lower alkyl, lower alkoxy, nitro, amino and substituted amino radicals. Examples of said alkyl and alkoxy radicals that are embraced herein are methyl, ethyl, propyl, tertiary butyl, methoxy, ethoxy, iso-propoxy and the like radicals. Examples of said substituted amino radicals are those derived from alkyl amines such as methylamine, ethylamine, isopropylamine, butylamine, dimethylamine, diethylamine, ethyl-sec.-butyl amine, diisopropylamine and the like; alkanolamines such as ethanolamine, diethanolamine, 2-amino-1-butanol, morpholine and the like; aryl amines such as aniline, diphenylamine and the like, mixed aromatic-aliphatic amines such as monomethyl-aniline, monoethylaniline and the like; aralkyl amines such as benzylamine, $\beta$-phenylethylamine and the like; halo-substituted aliphatic or aromatic amines such as $\beta$-chloroethylamine, para-chloroaniline, para-chlorobenzylamine and the like; and other substituted aliphatic or aromatic amines such as $\beta$-methoxy ethylamine, para-tolyl amine, para-methoxy aniline, and the like. R is not limited to the foregoing classes of substituents, however, and may, if desired represent such substituents as a halogen atom, such as fluorine, chlorine, bromine and iodine; a halogenated alkyl radical such as trifluoromethyl, difluoromethyl and the like; a hydroxy radical; an aryl radical such as phenyl, tolyl, and the like; an aryloxy radical such as phenoxy and substituted phenoxy radicals; an aralkyloxy radical such as benzyloxy; an alkenyloxy radical such as allyloxy; an alkynyloxy radical such as propargyloxy; a cycloalkylalkoxy radical such as cyclopropylmethyloxy; a cycloalkoxy radical such as cyclobenzyloxy; a cyano radical, an amino radical; a lower alkyl substituted amino radical; a lower alkyl substituted amino radical such as dimethylamino; an aminoalkyl radical such as aminomethyl, aminoethyl; a lower alkyl substituted aminoalkyl radical such as dimethylaminoethyl, lower alkyl- and dialkylsulfonamido radicals, preferably dimethylsulfonamido; a lower alkyl sulfonyl radical such as methyl sufonyl, ethyl sulfonyl and the like; a mercapto radical; and lower alkylthio and benzylthio radicals. In the preferred embodiments of this invention, the benzene portion of the indole ring is mono-substituted with an R substituent in the C–5 position.

In the novel compounds of this invention, $R_2$ may be a hydrogen atom or a hydrocarbon radical having less than nine carbon atoms. Lower alkyl groups such as methyl, ethyl, propyl, and butyl are preferred, although aryl, alkaryl and aralkyl groups are also advantageous, such as phenyl, benzyl, tolyl and the like. Furthermore, the alkoxy, halo, amino, substituted amino and nitro substituted derivatives of the foregoing are within the purview of this invention as are indoles having at the $R_2$ position an unsaturated aliphatic radical such as allyl, vinyl, and the like, or a cyclic aliphatic residue of the type cyclohexyl.

The $R_3$ component, which is attached to the alpha carbon atom of the aliphatic acid moiety affixed to the C–3 atom of the indole nucleus, may be a hydrogen atom, a lower alkyl radical such as methyl, ethyl, propyl, butyl and the like, an aralkyl radical such as benzyl, phenylethyl, and the like, or an alkenyl radical such as allyl, vinyl, and the like. The $\alpha$-(3-indolyl)aliphatic acids described herein are preferably lower aliphatic acids such as the $\alpha$-(3-indolyl) derivatives of acetic, propionic, butyric, valeric, 4-pentenoic and the like acids.

In addition to the aforementioned $\alpha$-(3-indolyl)aliphatic acids, the esters, salts and amide derivatives thereof, which are embraced within the symbol $R_1$ in the formulae above, constitute an additional aspect of this invention. Among the preferred esters are the lower alkyl esters such as the methyl, ethyl, propyl and t-butyl esters, and the aralkyl esters such as the benzyl, p-halobenzyl, and like esters having less than nine carbon atoms. Dialkylaminoalkyl esters, such as the dimethylaminoethyl, diethylaminoethyl and the like esters, are also included within the purview of this invention. The salts of these new $\alpha$-(3-indolyl)-aliphatic acids can be obtained by treatment of the free acid with base under mild conditions. In this manner there may be obtained salts of alkali metals such as lithium, sodium and potassium, the aluminum or magnesium salts, or salts of alkaline earth metals such as barium and calcium. Salts of organic amines such as alkylamine, morpholine, choline, methyl cyclohexylamine or glucosamine may be obtained by reacting the acid with the appropriate organic base. Salts of heavy metals such as zinc and iron are also within the purview of this invention.

In its more narrow and preferred aspects, the present invention embraces $\alpha$-(3-indolyl)aliphatic acids, including the corresponding esters, salts and amide derivatives thereof, having the structural formula:

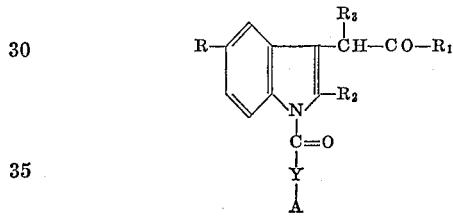

wherein R, $R_1$, $R_2$, $R_3$, Y and A are as heretofore described, and, when the benzene portion of the indole nucleus is mono-substituted by an R substituent other than hydrogen, said R substituent is located in the C–5 position.

The following compounds are representative of those contemplated within this invention and which may be prepared by the procedures discussed hereinbelow:

$\alpha$-[1-(N-phenyl carbamyl)-3-indolyl]acetic acid,
$\alpha$-[1-(N-naphthyl carbamyl)-2-ethyl-3-indolyl] acetic acid,
$\alpha$-[1-(N-p-chlorophenyl carbamyl)-3-indolyl] acetic acid,
$\alpha$-[1-(N-phenyl carbamyl)-3-indolyl]-4-pentenoic acid,
$\alpha$-[1-(N-p-methoxyphenyl carbamyl)-5-amino-3-indolyl] propionic acid,
$\alpha$-[1-(N-o,p-dichlorophenyl carbamyl)-3-indolyl] butyric acid,
$\alpha$-[1-(N-3'-pyridyl carbamyl)-3-indolyl]acetic acid,
$\alpha$-[1-(N-phenyl carbamyl)-2-methyl-3-indolyl]acetic acid,
$\alpha$-benzyl-$\alpha$-[1-(N-phenyl carbamyl)-2-methyl-5-methoxy-3-indolyl]acetic acid,
$\alpha$-[1-(N-p-chlorophenyl carbamyl)-2-methyl-5-methoxy-3-indolyl]acetic acid,
$\alpha$-[1-(N-p-methylthiophenyl carbamyl)-2,5-dimethyl-3-indolyl]acetic acid,
$\alpha$-[1-(N-2'-thiazolyl carbamyl)-2-ethyl-5-nitro-3-indolyl]acetice acid,
$\alpha$-[1-(N-2'-thienyl carbamyl)-2-methyl-5-dimethyl-amino-3-indolyl]acetic acid,
$\alpha$-[1-(N-2'-furyl carbamyl)-2-phenyl-3-indolyl]acetic acid,
$\alpha$-[1-(N-p-chlorophenyl-N-methyl carbamyl)-3-indolyl]acetic acid,
$\alpha$-[1-(N-phenyl-N-ethyl carbamyl)-2-methyl-5-methoxy-3-indolyl]acetic acid,
$\alpha$-[1-(N,N-diphenyl carbamyl)-2-ethyl-3-indolyl] acetic acid, α-[1-(p-chlorocarbophenoxy)-3-indolyl]acetic acid,
α-[1-(p-chlorocarbophenoxy)-5-methylthio-3-indolyl] acetic acid,
α-[1-(p-chlorocarbophenoxy)-2-methyl-5-methoxy-3-indolyl]acetic acid,
α-[1-(carbophenoxy)-2-methyl-5-fluoro-3-indolyl] propionic acid,
α-[1-(S-phenyl thiocarbonyl)-3-indolyl]acetic acid,
α-[1-(S-phenyl thiocarbonyl)-5-benzylthio-3-indolyl] acetic acid,
α-[1-(S-phenyl thiocarbonyl)-2-methyl-5-methoxy-3-indolyl]acetic acid,
α-[1-(S-2'-thienyl thiocarbonyl)-2-methyl-5-methoxy-3-indolyl]acetic acid,
α-[1-(S-2'-furyl thiocarbonyl)-2-methyl-3-indolyl] butyric acid,
methyl α-[1-(N-phenyl carbamyl)-3-indolyl]-acetate,
methyl α-[1-(N-phenyl carbamyl)-5-mercapto-3-indolyl]acetate,
methyl α-[1-(N-p-chlorophenyl carbamyl)-5-amino-methyl-3-indolyl]-acetate,
ethyl α-[1-(N-p-methoxyphenyl carbamyl)-5-dimethylamino-3-indolyl]-propionate,
methyl α-[1-(N-p-chlorophenyl carbamyl)-2-methyl-5-hydroxy-3-indolyl]-acetate,
t-butyl α-[1-(N-o,p-dichlorophenyl carbamyl)-3-indolyl]-acetate,
benzyl α-[1-(N-p-tolyl carbamyl)-2-methyl-3-indolyl] acetate,
methyl α-[1-(N-p-chlorophenyl carbamyl)-2-methyl-5-methoxy-3-indolyl]-acetate,
ethyl α-[1-(N-p-methylthiophenyl carbamyl)-2-methyl-5-methylthio-3-indolyl]-acetate,
methyl α-[1-(N-2'-thiazolyl carbamyl)-5-hydroxy-3-indolyl]-butyrate,
benzyl α-[1-(N-3'-pyridyl carbamyl)-2-methyl-5-methoxy-3-indolyl]-acetate,
methyl α-[1-(N-p-chlorophenyl-N-methyl carbamyl)-2-methyl-5-methoxy-3-indolyl]-acetate,
methyl α-[1-(p-chlorocarbophenoxy)-2-methyl-5-methox-y-3-indolyl]-acetate,
benzyl α-[1-(carbophenoxy)-2,5-dimethyl-3-indolyl]-propionate,
methyl α-[-1-(carbophenoxy)-2-methyl-5-cyclohexyloxy-3-indolyl]-acetate,
methyl α-[1-(p-chlorocarbophenoxy)-2-methyl-5-benzyloxy-3-indolyl]-acetate,
ethyl α-[1-(p-chlorocarbophenoxy)-2-methyl-5-nitro-3-indolyl]-acetate,
methyl α-[1-(p-chlorocarbophenoxy)-2-methyl-5-dimethylamino-3-indolyl]-acetate,
methyl α-[1-(S-phenyl thiocarbonyl)-3-indolyl]-propionate,
t-butyl α-[1-(S-p-tolyl thiocarbonyl)-2-ethyl-3-indolyl]-acetate,
α-[1-(N-phenyl carbamyl)-3-indolyl]-acetamide,
α-[1-(N-p-chlorophenyl carbamyl)-3-indolyl]-propionamide,
α-[1-(N-p-methoxyphenyl carbamyl)-2-methyl-5-methoxy-3-indolyl]-acetamide,
α-[1-(N-p-chlorophenyl carbamyl)-2-methyl-5-hydroxy-3-indolyl]-acetamide,
α-[1-(p-chlorocarbophenoxy)-2,5-dimethyl-3-indolyl]-propionamide,
α-[-(carbophenoxy)-2-methyl-5-trifluoromethyl-3-indolyl]-acetamide,
α-[1-(S-2'-furyl thiocarbonyl)-2-benzyl-3-indolyl]-acetamide,
α-[1-(S-3'-pyridyl thiocarbonyl)-2-methyl-5-benzyloxy-3-indolyl]-acetamide,
N,N-dimethyl α-[1-(S-phenyl thiocarbonyl)-2-methyl-5-methoxy-3-indolyl]-acetamide,
N,N-dimethyl α-[1-(p-chlorocarbophenoxy)-2-methyl-5-methoxy-3-indolyl]-acetamide,
sodium α-[1-(N-phenyl carbamyl)-3-indolyl]-acetate,
potassium α-[1-(N-p-chlorophenyl carbamyl)-3-indolyl]-propionate,
sodium α-[1-(N-p-chlorophenyl carbamyl)-2-methyl-5-methoxy-3-indolyl]-acetate,
morpholine α-[1-(N-phenyl carbamyl)-2,5-dimethyl-3-indolyl]-acetate,
sodium α-[1-(p-chlorocarbophenoxy)-2-methyl-5-methoxy-3-indolyl]-acetate,
sodium α-[1-(S-phenyl thiocarbonyl)-3-indolyl]-butyrate.

The novel α-(3-indolyl)aliphatic acids of this invention and the corresponding salts, esters and amides have analgesic activity as well as some anti-inflammatory activity. They are effective in the alleviation of pain due to inflammation or other causes. In addition, the compounds of this invention have a useful degree of antipyretic activity. For these various purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful, depending on the activity of the specific compound and the reaction sensitivity of the patient.

The compounds of this invention also absorb ultraviolet light and are generally useful as sun-screening materials in salves and ointments. In addition, because of their high solubility in organic materials generally, they may be used as ultra-violet absorbers in plastics and resins, such as polystyrene, polyethylene, polypropylene, polyacrylics (methacrylate resins, polyacrylamides, polyacrylonitrile fibers), polyamide fibers (nylon, e.g.) and polyester fibers. In the latter use, the inclusion of 0.01 to 5% of the absorber, based on the polymer weight, is sufficient to render protection against instability due to ultra-violet light. The absorber may be incorporated in the mixture of monomers before polymerization to form the polymer or it may be incorporated in the polymer at any stage during its handling, as by milling into the polymer together with other compounding ingredients or during the spinning of polymers into fibers, etc.

When Y is a divalent oxygen or sulfur atom or a trivalent nitrogen atom to which a hydrocarbon radical having less than nine carbon atoms is attached, the α-[1-(CO—Y—A)-3-indolyl]aliphatic acids described herein, and the ester and amide derivatives thereof, may be synthesized by acylation of the corresponding N–1 unsubstituted α-(3-indolyl)aliphatic acid, ester or amide, having the desired R and $R_2$ indole ring substituents attached thereto, with an acid halide having the formula A—Y—CO—X, wherein A is as previously defined, Y is a divalent oxygen or sulfur atom or a trivalent nitrogen atom to which a hydrocarbon radical having less than nine carbon atoms is attached, and X is a halogen, preferably chlorine, in an anhydrous organic solvent medium. It is preferred, however, to carry out the acylation step on an ester derivative of the particular α-(3-indolyl)aliphatic acid desired. After acylation, the ester may be readily converted to the free acid under suitable hydrolysis conditions.

It has been observed that, when the aryl (Ar) or heteroaryl (Het) constituent of the N–1 acyl group (—CO—Y—A)

or the benzene portion of the indole nucleus is substituted with a functional substituent that is a strong electron withdrawing group, e.g., —$CF_3$, —$O_2$, $SCH_3$, —$NO_2$, and the like, said N-1 acyl group may also undergo hydrolysis under certain conditions employed for the saponification of an ester to a free acid. Under these circumstances, care should be taken in converting the α-[1-(CO—Y—A)-3-indolyl]aliphatic acid esters to the corresponding free acids. It has been found that one convenient method of accomplishing this selective conversion comprises acylation of the benzyl ester derivative of an N-1 unsubstituted α-(3-indolyl) aliphatic acid with subsequent hydrogenolytic removal of the benzyl moiety. In this manner, the 1-acyl group is substantially unaffected. Alternatively, tertiary esters, such as the t-butyl esters, have been found to be amenable to selective removal of the ester moiety by other treatments, such as by heating above 210° C. or by heating at 25–110° C. in the presence of a catalytic amount of an acid such as an aryl sulfonic acid. In either event, the resulting α-[1-(CO—Y—A)-3-indolyl]aliphatic acids may then be reesterified or converted to the corresponding amide form or salt derivative to obtain the particular ester, amide or salt that may be desired.

The preferred starting materials for preparing the novel α-[1-(CO—Y—A)-3-indolyl]aliphatic acids of this invention are the corresponding alkyl or aralkyl N-1 unsubstituted α-(3-indolyl)aliphatic acid esters, which may be represented thusly:

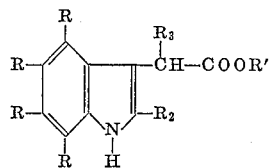

wherein R, $R_2$ and $R_3$ are as previously defined, and R' represents an alkyl or aralkyl radical of less than nine carbon atoms. The substitution of a —CO—Y—A group onto the N-1 position of these starting materials, wherein A is as previously defined and Y is a divalent oxygen or sulfur atom, or a trivalent nitrogen atom having a hydrocarbon radical having less than nine carbon atoms attached to it, is preferably conducted by first treating the N-1 unsubstituted α-(3-indolyl)aliphatic acid ester with a strongly basic non-hydroxylic agent such as an alkali metal hydride, for example, sodium hydride, lithium hydride, and the like, to form the corresponding alkali metal salt and then intimately contacting said salt with an acid halide, preferably the chloride, having the formula A—Y—CO—Cl, wherein A and Y are as heretofore described, in an anhydrous organic solvent medium. Stoichiometric quantities (i.e., equimolar) are advantageously employed. The reaction may be represented by the following equation:

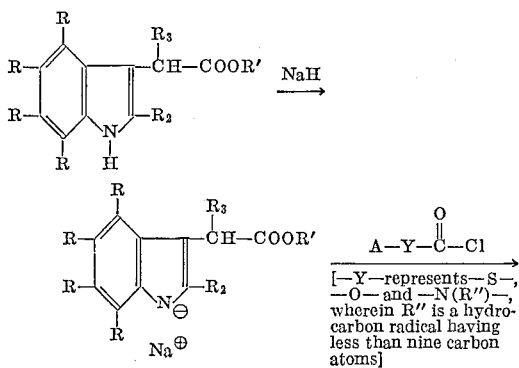

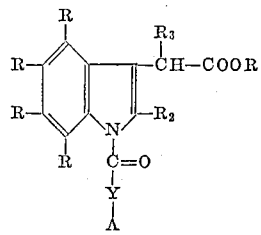

The foregoing reaction may be conveniently carried out at temperatures ranging from —30° C. to 150° C., although temperatures ranging from —10° C. to 100° C. are preferred. Among the anhydrous organic solvents operable herein are the dialkylformamides, such as dimethylformamide, diethylformamide and the like, aromatic hydrocarbons such as benzene, toluene, xylene, chlorobenzene, nitrobenzene and the like, mixtures of said dialkylformamides and said aromatic hydrocarbons, tetrahydrofuran, t-butanol and 1,2-dimethoxyethane. Other strong bases that may advantageously be utilized in lieu of the preferred alkali metal hydrides mentioned above are alkali metal amides such as sodamide, lithamide and the like, and alkali metal tertiary alkoxides such as sodium tertiary butoxide, potassium tertiary butoxide and the like. After reaction periods ranging from a few hours to a few days, the reaction mixture is treated with dilute acid and the ester product is extracted and purified in the conventional manner by suitable organic solvents or by column chromatographic techniques.

A preferred method of preparing the subject α-[1-(CO—Y—A)-3-indolyl]aliphatic acid esters, wherein —Y— is an —NH— group, is by forming an alkali metal salt of the corresponding N-1 unsubstituted α-(3-indolyl)aliphatic acid ester as shown above and then treating said salt with an aryl or heteroaryl isocyanate (A—N=C=O) under the same conditions described previously for the reaction with an acid chloride. The reaction may be represented as follows:

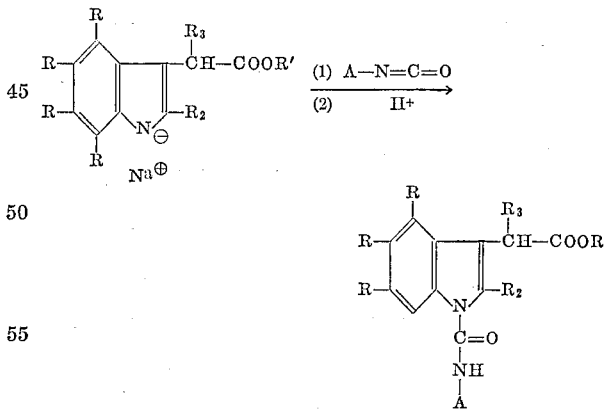

The foregoing esters, which are embraced within the purview of the novel compounds of this invention, may readily be saponified, preferably with a dilute solution of a strong alkali such as sodium or potassium hydroxide, to yield the corresponding α-[1-(CO—Y—A)-3-indolyl]aliphatic acids of this invention:

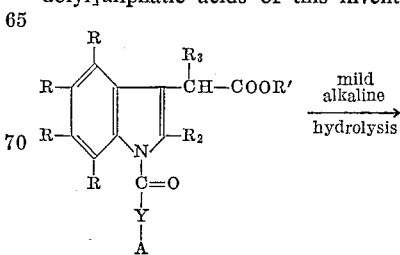

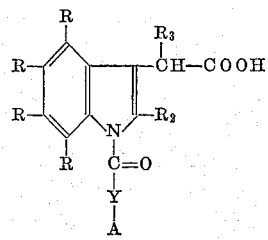

The α-[1-(CO—Y—A)-3-indolyl]aliphatic acid amides of this invention may be prepared from the corresponding α-[1-(CO—Y—A)-3-indolyl]aliphatic acids according to conventional techniques for the preparation of amides and N-substituted amides. For example, the respective acid may be converted to a symmetrical anhydride in the presence of a mild dehydrating agent such as dicyclohexyl carbodimide and then treated with ammonia to yield the corresponding amide, or with a primary or secondary amine having the desired substituents in an inert solvent to yield the corresponding substituted amides. Alternatively, the respective acid may be converted to a mixed anhydride by treatment with a non-hydroxylic base such as, for example, a tertiary alkyl amine, pyridine and the like, to yield an acid salt, followed by treatment with an acid halide such as, for example, an alkyl or aryl chloroformate, phosphorous oxychloride, thionyl chloride and the like, to yield the mixed anhydride which may then be treated with ammonia, primary amines or secondary amines to yield the corresponding amides. Among the primary and secondary amines that are operable herein are the alkyl amines such as methyl amine, ethylamine, isopropyl amine, butyl amine, diethylamine, diisopropyl amine and the like, alkanolamines piperidine, pyrrolidine, cyclopropylmethylamine such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine, methyl-β-phenylethylamine and the like, halo-substituted aliphatic or aromatic amines such as β-chloroethyl amine, parachloroaniline, m-trifluoromethyl aniline, para-chlorobenzyl amine and the like, and other substituted aliphatic or aromatic amines such as β-methoxy-ethyl amine, hydroxyalkylamine, para-tolyl amine, para-methoxy aniline, 1-ethyl-2-pyrrolidylmethyl-amine, N-methyl piperazine, 1-(β-hydroxyethyl)piperazine, N-phenyl piperazine and the like.

The subject α[1-(CO—Y—A)-3-indolyl]aliphatic acids may also be used to prepare the corresponding alkyl and aralkyl esters of this invention by conventional esterification techniques, such as by reaction with the appropriate alkyl or aralkyl alcohol, preferably in the presence of an acidic catalyst. An alternate method is by converting he α-[1-(CO—Y—A)-3-indolyl]aliphatic acids to symmetrical or mixed anhydrides, as previously described, which are then reacted with a desired alkyl or aralkyl alcohol in the presence of a non-hydroxylic base such as, for example, a tertiary alkylamine, pyridine and the like, or with an alkoxide such as sodium methoxide, potassium ethoxide, sodium butoxide and the like, to yield the corresponding alkyl or aralkyl ester.

The N–1 unsubstituted α-(3-indolyl)aliphatic acid esters employed as starting materials in the reactions discussed above, and having the formula:

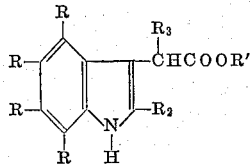

wherein R, R₂, R₃ and R' have the previously defined meanings, may be synthesized in various ways. When R₂ is hydrogen, methyl, aryl or aralkyl it is preferred to form such compounds by reacting together an appropriately substituted phenylhydrazine (III) and a compound of Formula IV to form an intermediate phenylhydrazone which cyclizes under the reaction conditions to the indole compound (V):

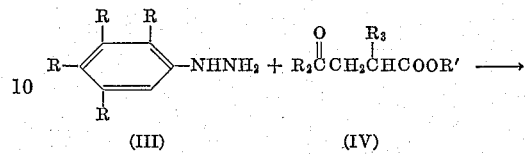

(III)  (IV)

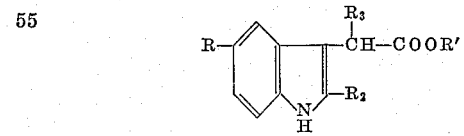

(V)

wherein R, R₃ and R' are as defined above, and R₂ is hydrogen, methyl, aryl or aralkyl. The reaction is normally carried out in a lower alkanol such as methanol, ethanol, isopropanol, or butanol containing an acid such as hydrochloric, hydrobromic, sulfuric, or acetic acid or in aqueous mineral acid such as concentrated hydrochloric, hydrobromic, sulfuric or acetic acid, or other Lewis acids such as $ZnCl_2$, $BF_3$, $SnCl_4$ and the like. The acid serves as a catalyst in the condensation and ring closure reactions leading to the indole compound (V). When possible, to avoid the possibility of transesterification, the alcohol used as the solvent medium is preferably the same as the alcohol moiety (—OR') of the compound (IV) ester. When R₂ is hydrogen, it is convenient to employ the aldehyde in the form of an acetal, e.g., methyl γ,γ-dimethoxy butyrate. An acid addition salt of the phenylhydrazine reactant, for example the hydrochloride, is normally preferred over the free base for practical reasons, although such salts and the base are equivalent in the reaction itself.

Formation of the α-(3-indolyl)aliphatic acid esters is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the esters of Formula V are generally low melting solids, they are conveniently purified by distillation under reduced pressure.

The foregoing process has been found to be particularly suitable for the preparation of α-(3-indolyl)aliphatic acid esters having the formula:

R—[indole]—CH—COOR'
         R₃
         R₂ wherein R, R₂, R₃ and R' are as described heretofore, in which case the starting phenylhydrazines (III) that are employed must be substituted in the para-position when R is a group other than hydrogen. Formation of N–1 unsubstituted α-(3-indolyl)aliphatic acid amides may also be accomplished by the foregoing process in which case the amide derivative of the desired levulinic acid is reacted with the appropriately substituted phenylhydrazine (III).

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

The 1-acyl group in the α[1-(CO—Y—A)-3-indolyl] aliphatic acid esters of this invention may, on occasion, as has been mentioned earlier, be hydrolyzed under the conditions used to saponify an ester. For this reason, the benzyl ester of the intermediate α-(1-unsubstituted-3-indolyl) acids are a convenient starting material. These are obtained by forming the free α-(1-unsubstituted-3-indolyl)-aliphatic acid and esterifying this with benzyl alcohol in an inert solvent with an acid catalyst (sulfuric, aryl sulfonic acids, etc.). Alternatively, the intermediate benzyl ester is synthesized directly by using the benzyl ester of the proper levulinic acid in the original synthesis of the indole ring, or is formed by base catalyzed ester exchange from other esters. After acylation of the indole nitrogen of these benzyl ester intermediates, the benzyl group can easily be removed by hydrogenolysis, a process which leaves the 1-acyl group untouched.

Alternatively, it is possible to first produce an indole of the formula:

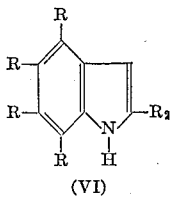

where R and $R_2$ are as previously defined, and then introduce the carboxylic acid residue at the 3-position. This is accomplished by treating the indole of Formula VI under Mannich reaction conditions with formaldehyde-dialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure (VI) shown above, it is particularly useful for making compounds of this invention wherein $R_2$ is an alkyl radical other than methyl, such as the 2-ethyl, 2-propyl, 2-allyl and like substances. Compounds of Formula VI are readily prepared following the procedures set forth in columns 2 and 3 of U.S. Patent No. 2,825,734.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides give mono and dialkyl amino groups. If the alkyl halide is a dihaloalkylene group (e.g., 1,4-dibromobutane) a heterocyclic ring (e.g., pyrrolidine) is formed. Similarly, bis(β-chloroethyl)ether will give an N-morpholino compound. Alkylation can also be carried out simultaneously with reduction, as, e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

The acid halides used in acylating the nitrogen atom of the N-1 unsubstituted α-(3-indolyl) aliphatic acid esters in the procedures described above may be represented by the general formula A—Y—CO—X, wherein A is an aryl, substituted aryl, heteroaryl or substituted heteroaryl radical as heretofore described, Y is a divalent oxygen or sulfur atom or a trivalent nitrogen atom to which a hydrocarbon radical (R″) of less than nine carbon atoms is attached, and X is a halogen atom such as chlorine or bromine, preferably chlorine. These acid halides may be classified into three groups:

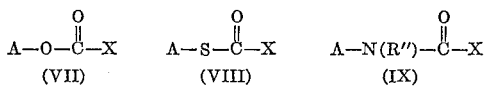

Many of the compounds embraced within these groups are well known and commercially available and various procedures for the preparation thereof have been reported in the literature (for example, see Examples 8, 9, 11 and 12 of U.S. Pat. No. 2,839,536). In addition, the following procedure is offered as a general means of preparing any of the compounds included within the three groups.

To prepare compounds of the Formula VII and Formula VIII types, phosgene is reacted with the hydroxy or thiol derivative, respectively, of the particular aryl or heteroaryl moiety that is desired in the resulting acid chloride product. To prepare compounds of the Formula IX type, phosgene is reacted with an aroyl or heteroaroyl amine in which one of the amino hydrogens has been replaced with a hydrocarbon radical (R″) of less than nine carbon atoms. The respective reactions may be illustrated by the following equations, wherein A is an aryl, substituted aryl, heteroaryl or substituted heteroaryl radical as heretofore described:

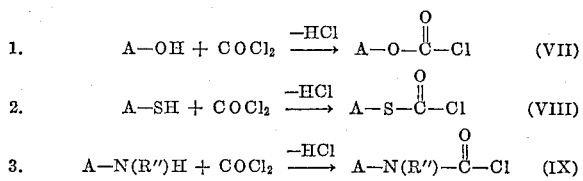

Equimolar quantities of each reactant are advantageously employed. Preferably, the reactions are conducted in anhydrous organic solvents, such as dry aromatic hydrocarbons, e.g., benzene, toluene, xylene and the like, and at temperatures generally below room temperature, usually 0°–15° C., although temperatures below 0° C. and above 15° C. may sometimes be required, depending on the reaction rate of the particular aromatic reactant employed. The reactions are preferably run in the presence of a halogen acid acceptor. The term "halogen acid acceptor," as used herein, means those compounds which may be added to the reaction mixture to combine or react with the halogen acid that is formed during the progress of the reaction so that the equilibrium of the reaction is shifted in a manner favoring completion of the reaction. The amount of halogen acid acceptor that may be employed is not critical, but, for optimum conditions, the theoretical number of moles of halogen acid liberated during the course of the reaction can easily be calculated and, thus, the corresponding amount of halogen acid acceptor that need be employed can readily be determined. The halogen acid acceptor need not be soluble in the organic solvent. The preferred halogen acid acceptors are organic liquids having a tertiary amine-like structure. They may be heterocyclic, such as N-alkyl piperidine, N-alkyl morpholine, pyridine, lutidine, or quinoline; aliphatic amines such as triethyl amine, tributyl amine or, in general, trialkyl amines; dialkyl aromatic amines such as diethyl aniline or dimethyl aniline. Although less preferred, alkali hydroxides such as sodium and potassium hydroxide may also be used. The resulting aryl or heteroaryl chloroformates (VII) and the resulting aryl or heteroaryl thiocarbonyl chlorides (VIII) may then be separated from the reaction mixture by conventional techniques such as by vacuum distillation.

The aryl or heteroaryl isocyanates (A—N=C=O) that are used herein to prepare the novel α-[1-(CO—Y—A)-3-indolyl]aliphatic acid esters of this invention, wherein —Y— is an —NH— group, may be prepared from the corresponding aroyl or heteroaroyl hydrazide in a two-step process. The aroyl or heteroaroyl hydrazide is first converted to the corresponding azide which is then converted to the corresponding aryl or heteroaryl isocyanate. The reactions may be illustrated as follows:

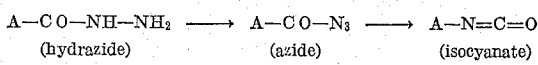

$$A\text{—CO—NH—NH}_2 \longrightarrow A\text{—CO—N}_3 \longrightarrow A\text{—N=C=O}$$
(hydrazide)      (azide)      (isocyanate)

The first of these steps involves the action of nitrous acid on an acyl hydrazide. The reaction is usually carried out by dissolving the hydrazide (basic) in a slight excess of dilute aqueous hydrochloric acid cooled to 0°–8° C., the aqueous solution being in contact with ether or carbon tetrachloride to extract the azide as rapidly as it is formed, and adding sodium nitrite with stirring. Alcohol and acetic acid have sometimes been used as solvents. The second step involves the decomposition of the acyl azide, preferably by heating, in an inert solvent with the formation of the isocyanate (the Curtius rearrangement) and the evolution of nitrogen.

The aryl or heteroaryl isocyanates may also be prepared from the interaction of an aryl or heteroaryl amine with an excess of phosgene, which leads to the production of a corresponding carbamyl chloride which may be decomposed on heating with liberation of hydrogen chloride and formation of the desired isocyanate. The reactions may be illustrated thusly:

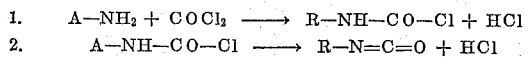

1.    $A\text{—NH}_2 + COCl_2 \longrightarrow R\text{—NH—CO—Cl} + HCl$
2.    $A\text{—NH—CO—Cl} \longrightarrow R\text{—N=C=O} + HCl$ In view of the foregoing, the instant invention has provided a new group of chemical compounds and methods of preparing same, which compounds may be described as α-[1-(CO—Y—A)-3-indolyl]-aliphatic acids, and the salts, esters and amide derivatives of said acids, wherein Y is a member selected from the group consisting of divalent oxygen and sulfur atoms and a trivalent nitrogen atom, in the latter case said nitrogen atom having a member selected from the class consisting of a hydrogen atom and a hydrocarbon radical having at least nine carbon atoms attached to it, and A is a member selected from the group consisting of aryl, substituted aryl, heteroaryl and substituted heteroaryl radicals.

The following examples are given for purposes of illustration and not by way of limitation:

EXAMPLE 1

*Preparation of methyl α-[1-(N-p-chlorophenyl carbamyl)-2-methyl-5-methoxy-3-indolyl]-acetate*

To a solution of 4.7 g. (0.02 mole) of methyl α(2-methyl-5-methoxy-3-indolyl)-acetate in 60 ml. of dry dimethylformamide is added 1.2 g. (0.05 mole) of sodium hydride (50% emulsion in mineral oil) with stirring and ice-cooling. After ½ hour, 3.4 g. (0.022 mole) of p-chlorophenyl isocyanate is added, and the mixture is stirred at 0° C. for 1 hour and at room temperature for 18 hours. The reaction mixture is poured into iced water containing 3 ml. of acetic acid and then extracted with ether. The ether solution is dried over sodium sulfate and evaporated to a brown crystalline mass. The crude product is triturated with 60 ml. of benzene and the residual solid is recrystallized from a mixture of ethylacetate-ethanol. The product, methyl α-[1-(N-p-chlorophenyl carbamyl)-2-methyl-5-methoxy - 3 - indolyl] - acetate, melts at 167° C. and its infrared spectrum shows strong absorption at 5.8 and 5.95µ.

EXAMPLE 2

In accordance with the procedure of Example 1, but substituting an equivalent quantity of the following esters for the methyl α-(2-methyl-5-methoxy-3-indolyl)-acetate used therein, there are obtained the corresponding 1-(N-p-chlorophenyl carbamyl) derivatives of these esters:

methyl-α-(3-indolyl)-acetate,
benzyl-α-(3-indolyl)-propionate,
methyl-α-(2-methyl-3-indolyl)-acetate,
methyl-α-(2-phenyl-3-indolyl)-acetate,
methyl-α-(2,5-dimethyl-3-indolyl)-acetate,
methyl-α-(5-methoxy-3-indolyl)-acetate,
methyl-α-(5-methyl-3-indolyl)-acetate,
ethyl-α-(5-fluoro-3-indolyl)-acetate,
methyl-α-(2-methyl-5-phenyl-3-indolyl)-acetate,
methyl-α-(2-methyl-5-bromo-3-indolyl)-acetate,
methyl-α-(2-methyl-5-fluoro-3-indolyl)-acetate,
methyl-α-(2-phenyl-5-methoxy-3-indolyl)-acetate,
methyl-α-(2-phenyl-5-methyl-3-indolyl)-acetate,
methyl-α-(2-methyl-5-methoxy-3-indolyl)-butyrate,
methyl-α-(2-methyl-5-dimethylamino-3-indolyl)-acetate,
methyl-α-(2-methyl-5-nitro-3-indolyl)-acetate,
ethyl-α-(2-methyl-5-methylthio-3-indolyl)-acetate,
benzyl-α-(2-methyl-5-methoxy-3-indolyl)-propionate, and
methyl-α-(2-ethyl-5-trifluoromethyl-3-indolyl)-acetate.

EXAMPLE 3

A. *Preparation of α-[1-(N-p-chlorophenyl carbamyl)-2-methyl-5-methoxy-3-indolyl]acetic acid*

A solution of 0.02 mole of methyl α-[1-(N-p-chlorophenyl carbamyl)-2-methyl - 5 -methoxy-3-indolyl]-acetate in 100 ml. of 90% aqueous ethanol containing one equivalent of potassium hydroxide is allowed to stand overnight, then diluted with ice-water, extracted with ether to remove neutral material, neutralized with acetic acid, and weakly acidified with dilute hydrochloric acid. The precipitate is filtered, washed with cold water, and the product, α-[1-(N-p-chlorophenyl carbamyl)-2-methyl-5-methoxy-3-indolyl]acetic acid, is recrystallized from aqueous ethanol.

B. In accordance with the procedure of Example 3 (A), but utilizing an equivalent quantity of the respective 1-(N-p-chlorophenyl carbamyl) indolyl ester compounds obtained from Example 2 for the methyl α-[1-(N-p-chlorophenyl carbamyl) - 2 - methyl-5-methoxy-3-indolyl]-acetate of Example 3 (A), there are obtained the corresponding 1-(N-p-chlorophenyl carbamyl) acids.

EXAMPLE 4

A. The corresponding N–1 aryl or heteroaryl carbamyl derivatives of methyl α-(2-methyl-5-methoxy-3-indolyl)-acetate are obtained by reacting together, according to the procedure of Example 1, equivalent quantities of the sodium salt of methyl α-(2-methyl-5-methoxy-3-indolyl)-acetate and one of the following compounds:

phenyl isocyanate,
p-chlorophenyl isocyanate,
p-methoxyphenyl isocyanate,
β-naphthyl isocyanate,
o,p-dichlorophenyl isocyanate,
o-tolyl isocyanate,
m-tolyl isocyanate,
p-tolyl isocyanate,
2-thienyl isocyanate,
3-methyl-2-thienyl isocyanate,
2-furyl isocyanate,
3-furyl isocyanate,
m-trifluoromethylphenyl isocyanate,
o-cyanophenyl isocyanate,
p-methylthiophenyl isocyanate,
3-pyridyl isocyanate,
2-thiazolyl isocyanate,
4-thiazolyl isocyanate, and
5-thiazolyl isocyanate.

B. The resulting 1-substituted indolyl esters are converted to the corresponding 1-substituted free acids by the procedure of Example 3 (A).

EXAMPLE 5

A. The procedure of Example 1 is followed, except that equivalent quantities of the sodium salts of the respective N–1 unsubstituted esters listed in Example 2 are reacted with the respective isocyanates listed in Example 4 to yield the corresponding N–1 aryl and heteroaryl carbamyl ester compounds.

B. The resulting 1-substituted indolyl esters of Example 5 (A) are converted to the corresponding 1-substituted free acids by the procedure of Example 3 (A).

EXAMPLE 6

A. The procedure of Example 1 is followed except that, in lieu of the p-chlorophenyl isocyanate used therein, an equivalent quantity of N-p-chlorophenyl-N-methyl carbamyl chloride, N-phenyl-N-ethyl carbamyl chloride, and N,N-diphenyl carbamyl chloride, respectively, is reacted with the sodium salt of methyl α-(2-methyl-5-methoxy-3-indolyl)-acetate to yield the corresponding methyl α-[1-(N-p-chlorophenyl-N-methyl carbamyl)-2-methyl-5-methoxy-3-indolyl]-acetate, methyl α[1-(N-phenyl-N-ethyl carbamyl)-2-methyl-5-methoxy-3-indolyl]-acetate, and methyl α-[1-(N,N-diphenyl carbamyl)-2-methyl-5-methoxy-3-indolyl]-acetate, respectively.

B. In accordance with the procedure of Example 1, an equivalent quantity of N-p-chlorophenyl-N-methyl carbamyl chloride, N-phenyl-N-ethyl carbamyl chloride, and N,N-diphenyl carbamyl chloride, respectively, is reacted with the sodium salt of each of the N–1 unsubstituted esters listed in Example 2 to yield, accordingly, the corresponding 1-(N-p-chlorophenyl-N-methyl carbamyl), 1-(N-phenyl-N-ethyl carbamyl) and 1-(N,N-diphenyl carbamyl) derivatives of these esters.

C. The resulting 1-substituted indolyl esters of Examples 6 (A) and 6 (B) are converted to the corresponding 1-substituted free acids by the procedure of Example 3 (A).

EXAMPLE 7

A. The procedure of Example 1 is followed except that, in lieu of the p-chlorophenyl isocyanate used therein, an equivalent quantity of phenyl chloroformate, p-tolyl chloroformate, 2,4-dichlorophenyl chloroformate, 2-furfuryl chloroformate, p-methyl-mercaptophenyl chloroformate, p-chlorophenyl chloroformate, o-chlorophenyl chloroformate, p-methoxyphenyl chloroformate, m-trifluoromethylphenyl chloroformate, 3-pyridyl chloroformate, 2-thienyl chloroformate, 2-furyl chloroformate and 2-thiazolyl chloroformate, respectively, is reacted with the sodium salt of methyl α-(2-methyl-5-methoxy-3-indolyl)-acetate to yield the corresponding 1-(CO—O—A) derivatives, respectively, of methyl α-(2-methyl-5-methoxy-3-indolyl)-acetate.

B. In accordance with the procedure of Example 1, an equivalent quantity of each of the respective aryl and heteroaryl chloroformates listed in Example 7 (A) is reacted with the sodium salt of each of the N–1 unsubstituted esters listed in Example 2 to yield, accordingly, the corresponding 1-(CO—O—A) derivatives of these esters.

C. The resulting 1-substituted indolyl esters of Examples 7 (A) and 7 (B) are converted to the corresponding 1-substituted free acids by the procedure of Example 3 (A).

EXAMPLE 8

A. The procedure of Example 1 is followed except that, in lieu of the p-chlorophenyl isocyanate used therein, an equivalent quantity of S-phenyl thiocarbonyl chloride, S-o-nitrophenyl thiocarbonyl chloride, S-2,6-dimethylphenyl thiocarbonyl chloride, S-2-thienyl thiocarbonyl chloride, S-2-furyl thiocarbonyl chloride, S-p-tolyl thiocarbonyl chloride and S-3-pyridyl thiocarbonyl chloride, respectively, is reacted with the sodium salt of methyl α - (2-methyl-5-methoxy-3-indolyl)-acetate to yield the corresponding 1-(CO—S—A) derivatives, respectively, of methyl α-(2-methyl-5-methoxy-3-indolyl)-acetate.

B. In accordance with the procedure of Example 1, an equivalent quantity of each of the respective aryl and heteroaryl thiocarbonyl chlorides listed in Example 8 (A) is reacted with the sodium salt of each of the N–1 unsubstituted esters listed in Example 2 to yield, accordingly, the corresponding 1-(CO—S—A) derivatives of these esters.

C. The resulting 1-substituted indolyl esters of Examples 8 (A) and 8 (B) are converted to the corresponding 1-substituted free acids by the procedure of Example 3 (A).

EXAMPLE 9

*Preparation of α-[1-(p-trifluoromethylcarbophenoxy)-2-methyl-5-methoxy-3-indolyl]acetic acid*

A. A solution of 15 g. of methyl-(2-methyl-5-methoxy-3-indolyl)-acetate and 0.2 g. of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of 18.6 g. of benzyl α-(2-methyl-5-methoxy-3-indolyl)-acetate.

In accordance with the procedure of Example 1, p-trifluoromethylphenyl chloroformate is reacted with the sodium salt of the benzyl α-(2-methyl-5-methoxy-3-indolyl)-acetate obtained above, in equivalent quantities, to yield benzyl α-[1-(p-trifluoromethylcarbophenoxy)-2-methyl-5-methoxy-3-indolyl]-acetate.

1.5 g. of benzyl α-[1-(p-trifluoromethylcarbophenoxy)-2-methyl-5-methoxy-3-indolyl]-acetate is added to 20 ml. of ethyl acetate containing a drop of acetic acid and reduced catalytically at room temperature with hydrogen in the presence of palladium on charcoal catalyst. When the reduction is complete, the catalyst is removed by filtration and the filtrate evaporated to a crystalline residue. This residue is recrystallized from aqueous ethanol to give the product, α-[1-(p-trifluoromethylcarbophenoxy)-2-methyl-5-methoxy-3-indolyl]acetic acid.

B. Tertiary butyl α[1-(p-trifluoromethylcarbophenoxy)-2-methyl-5-methoxy-3-indolyl]-acetate is treated with 5% paratoluene-sulfonic acid in benzene at the reflux temperature for 1 hour to give the corresponding α-[1-(p-trifluoromethylcarbophenoxy) - 2 - methyl-5-methoxy-3-indolyl]acetic acid.

EXAMPLE 10

*Methyl α-[1-(p-chlorophenyl carbamyl)-2-methyl-5-dimethylamino-3-indolyl]-acetate*

To a solution of 0.01 mole of methyl α-[1-(p-chlorophenylcarbamyl)-2-methyl-5-nitro-3-indolyl] - acetate in 20 ml. of distilled dimethoxyethane is added 1.5 ml. of glacial acetic acid and 0.5 ml. of a 37% solution of aqueous formaldehyde. This mixture is reduced with hydrogen and Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to yield the product, methyl α-[1-(p-chlorophenylcarbamyl)-2-methyl-5-dimethylamino-3-indolyl]-acetate.

EXAMPLE 11

*Methyl α-[1-(p-chlorophenyl carbamyl)-2-methyl-5-acetamino-3-indolyl]-acetate*

To 0.01 mole of methyl α-[1-(p-chlorophenyl carbamyl)-2-methyl-5-nitro-3-indolyl]-acetate in 30 ml. of anhydrous ethyl acetate is added 0.02 mole of acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate followed by water, dried with anhydrous sodium sulfate and concentrated in vacuo to dryness. The product, methyl α[1-(p-chlorophenyl carbamyl)-2-methyl-5-acetamino-3-indolyl] - acetate is crystallized from benzene and ether.

EXAMPLE 12

A. *Methyl α[1-(p-chlorocarbophenoxy)-2-methyl-5-bis(β-hydroxyethyl)amino-3-indolyl]-acetate*

A mixture of 0.02 mole of methyl α-[1-(p-chlorocarbophenoxy - 2 - methyl-5-amino-3-indolyl]-acetate, 0.044 mole of ethylene oxide and 0.03 mole of acetic acid in 300 ml. dimethoxyethane is heated to 100° C. for 18 hours in an autoclave. The mixture is then diluted with water and filtered to yield crude methyl α-[1-(p-chlorocarbophenoxy)-2-methyl-5-bis(β-hydroxyethyl)amino - 3 - indolyl]-acetate.

B. *Methyl α-[1-(p-chlorocarbophenoxy)-2-methyl-5-(4'-methyl-1'-piperazinyl)-3-indolyl]-acetate*

The product of Example 12 (A) is stirred at 0° C. in pyridine with two mole proportions of p-toluenesulfonyl chloride until the reaction is substantially complete. The mixture is poured into water and the 5-bis(p-toluenesulfonyloxyethyl)amino compound is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields the product, methyl α-[1-(p-chlorocarbophenoxy) - 2 - methyl-5-(4'-methyl-1'-piperazinyl) - 3 - indolyl]-acetate.

EXAMPLE 13

*Methyl α-[1-(p-chlorocarbophenoxy)-2-methyl-5-(4'-morpholinyl)-3-indolyl]-acetate*

A solution of tosyl chloride (0.1 mole) in 200 ml. benzene is added dropwise with stirring to a solution of methyl α-[1-(p-chlorocarbophenoxy)-2-methyl-5-bis(β-hydroxyethyl)amino-3-indolyl]-acetate (0.1 mole) and pyridine (0.3 mole) in 300 ml. benzene at room temperature over a period of one hour. The mixture is then heated under reflux for 3 hours, washed with water, dried over sodium sulfate and evaporated to a syrup. Chromatography of the syrup on an alumina column using 30–50% (v./v.) ether in petroleum ether as the eluent affords the product, methyl α-[1-(p-chlorocarbophenoxy)-2-methyl-5-(4'-morpholinyl)-3-indolyl]-acetate.

EXAMPLE 14

A. *α-[1-(N-p-chlorophenyl carbamyl)-2-methyl-5-hydroxy-3-indolyl]-acetic acid*

1.0 gram of α-[1-(N-p-chlorophenyl carbamyl)-2-methyl-5-methoxy-3-indolyl]acetic acid is heated with 5.0 gms. of pyridine hydrochloride at about 180° C. for 5–10 minutes. The reaction mixture is cooled, diluted with water, and the crude product filtered. Recrystallization from aqueous ethanol yields the product, α-[1-(N-p-chlorophenyl carbamyl) - 2-methyl-5-hydroxy-3-indolyl]-acetic acid.

B. *Methyl α-[1-(p-chlorocarbophenoxy)-2-methyl-5-hydroxy-3-indolyl]-acetate*

0.01 mole of methyl α-[1-(p-chlorocarbophenoxy)-2-methyl-5-benzyloxy-3-indolyl]-acetate is added to 20 ml. of ethyl acetate containing a drop of acetic acid and debenzylated catalytically at room temperature with hydrogen in the presence of palladium on charcoal catalyst. When the reduction is complete, the catalyst is removed by filtration and the filtrate evaporated to a crystalline residue which is recrystallized from aqueous ethanol to give the product, methyl α-[1-(p-chlorocarbophenoxy)-2-methyl-5-hydroxy-3-indolyl]-acetate.

EXAMPLE 15

A. *Preparation of α-[1-(p-chlorocarbophenoxy)-2-methyl-5-methoxy-3-indolyl]acetic acid anhydride*

To a solution of 0.05 mole of α-[1-(p-chlorocarbophenoxy)-2-methyl-5-methoxy-3-indolyl]acetic acid in 300 ml. of dry tetrahydrofuran is added 0.025 mole of dicyclohexyl carbodiimide with ice-cooling and stirring. The mixture is allowed to remain at 0–5° C. for 1 hour and then at room temperature (about 25° C.) for an additional 4–6 hours. The solution is filtered to remove the dicyclohexylurea formed, and concentrated in vacuo to a residue. The resulting anhydride is recrystallized from a mixture of benzene and petroleum ether.

B. The procedure of Example 15(A) is followed using an equivalent quantity of α-[1-(p-chlorophenyl carbamyl)-2-methyl-5-methoxy-3-indolyl]acetic acid and α-[1-(S-phenyl thiocarbonyl)-2-methyl-5-methoxy-3-indolyl]acetic acid, respectively, in place of the α-[1-(p-chlorocarbophenoxy)-2-methyl-5-methoxy-3-indolyl]acetic acid used therein to obtain the corresponding α-[1-(p-chlorophenyl carbamyl)-2-methyl-5-methoxy-3-indolyl]acetic acid anhydride and α-[1-(S-phenylthiocarbonyl)-2-methyl-5-methoxy-3-indolyl]acetic acid anhydride.

EXAMPLE 16

A. *Preparation of N,N-dimethyl α-(1-p-chlorocarbophenoxy)-2-methyl-5-methoxy-3-indolyl)-acetamide*

A solution of 0.01 mole of α-[1-(p-chlorocarbophenoxy)-2-methyl-5-methoxy-3-indolyl]-acetic acid anhydride in 50 ml. tetrahydrofuran is treated with 0.02 mole of anhydrous dimethylamine at 0° C. with stirring. After one-half hour, the solution is filtered to remove the dimethylamine salt, diluted with 200 ml. ether, washed with sodium bicarbonate, dried over sodium sulfate and then concentrated in vacuo to yield N,N-dimethyl-α-[1-(p-chlorocarbophenoxy) - 2-methyl - 5-methoxy-3-indolyl]-acetamide which is recrystallized from a mixture of benzene and petroleum ether.

B. In accordance with the above procedure, but substituting an equivalent quantity of isopropylamine, diethanolamine, aniline, mono-ethylaniline, benzylamine, para-chloroaniline, β-methoxyethylamine, morpholine and para-methoxyaniline, respectively, in place of the dimethylamine used therein, there are obtained, respectively, the corresponding N-substituted acetamides.

C. The procedure of Example 16 (A) is followed using dry ammonia gas instead of dimethylamine. The ammonia is bubbled through the tetrahydrofuran solution of the indolyl acid anhydride. The product is α-[1-(p-chlorocarbophenoxy) - 2 - methyl-5-methoxy-3-indolyl]-acetamide.

D. The procedure of Example 16 (C) is followed using equivalent quantities of the respective indolyl acid anhydrides prepared in Example 15 (B) to yield the corresponding indolyl acetamides.

EXAMPLE 17

A. *Preparation of isopropyl α-[1-(p-chlorocarbophenoxy)-2-methyl-5-methoxy-3-indolyl]-acetate*

A solution of 0.01 mole of α-[1-(p-chlorocarbophenoxy)-2-methyl-5-methoxy-3-indolyl]-actic acid anhydride, 0.01 mole of triethylamine and 0.01 mole of isopropanol in 50 ml. of dimethoxyethane is allowed to stand at 0° C. for 1 hour and then at room temperature for 4–6 hours. The solution is concentrated in vacuo to about 10 ml. and diluted with 50 ml. of ether. The ether solution is filtered from the triethylamine salt, washed with sodium bicarbonate, dried over sodium sulfate, and then evaporated to give the isopropyl ester.

B. In accordance with the above procedure, but substituting an equivalent quantity of methanol, ethanol, tertiary-butanol, benzyl alcohol, β-dimethylamino ethanol and β-phenylethyl alcohol, respectively, in place of the isopropanol used therein, there are obtained, respectively, the corresponding esters.

C. The procedure of Examples 17 (A) and 17 (B) are followed using equivalent quantities of the respective indolyl acid anhydrides prepared in Example 15 (B), in lieu of the α-[1-(p-chlorocarbophenoxy)-2-methyl-5-methoxy-3-indolyl]acetic acid anhydride used therein, to yield the corresponding alkyl, aralkyl and dialkylaminoalkyl esters.

EXAMPLE 18

A. *Preparation of the morpholine salt of α-[1-(p-chlorocarbophenoxy)-2-methyl-5-methoxy-3-indolyl]acetic acid*

To a solution of 0.01 mole of α-[1-(p-chlorocarbophenoxy)-2-methyl-5-methoxy-3-indolyl]acetic acid in 100 ml. of ether at 0° C. is added a solution of 0.01 mole of morpholine in 50 ml. of ether, dropwise, with stirring. The mixture is filtered and the resulting crystalline morpholine salt of α-[1-(p-chlorocarbophenoxy)-2-methyl-5-methoxy-3-indolyl]acetic acid is washed with ether and dried in vacuo.

B. The procedure of Example 19 (A) is followed using, in place a morpholine, an equivalent amount of each of the following amines, to yield the corresponding amine salts of α-[1-(p-chlorocarbophenoxy)-2-methyl-5-methoxy-3-indolyl]acetic acid: trimethylamine, triethylamine, n-butylamine, aniline, choline, 2,3-xylidine and piperazine.

C. The procedures of Example 19 (A) and 19 (B) are followed except that α-[1-(p-chlorophenyl carbamyl)-2-methyl-5-methoxy-3-indolyl]acetic acid and α-[1-(S-phenyl thiocarbonyl)-2-methyl-5-methoxy-3-indolyl]acetic acid, respectively, are used in place of the α-[1-(p-chlorocarbophenoxy)-2-methyl-5-methoxy-3-indolyl]acetic acid used therein to yield, respectively, the corresponding amine salts of these acids.

EXAMPLE 19

A. *Preparation of sodium α-[1-(p-chlorocarbophenoxy)-2-methyl-5-methoxy-3-indolyl]-acetate*

To a solution of 0.01 mole of α-[1-(p-chlorocarbophenoxy)-2-methyl-5-methoxy-3-indolyl]acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

B. The procedure of Example 20 (A), is followed using 0.01 mole of each of the following alkoxides or hydroxides in place of sodium methoxide, to produce the corresponding metal salts: potassium methoxide, aluminum isopropoxide, magnesium hydroxide and calcium hydroxide.

C. The procedures of Example 20 (A) and 20 (B) are followed except that α-[1-(p-chlorophenyl carbamyl)-2-methyl-5-methoxy-3-indolyl]acetic acid and α-[1-(S-phenyl thiocarbonyl) - 2 - methyl - 5-methoxy-3-indolyl]acetic acid, respectively, are used in place of the α-[1-(p-chlorocarbophenoxy)-2-methyl-5-methoxy-3-indolyl]acetic acid used therein to yield, respectively, the corresponding metal salts of these acids.

EXAMPLE 20

A. *Preparation of isobutyric α-[1-(p-chlorocarbophenoxy)-2-methyl-5-methoxy-3-indolyl]acetic acid anhydride*

A solution of 0.01 mole of α-[1-(p-chlorocarbophenoxy)-2-methyl-5-methoxy-3-indolyl]acetic acid in 100 ml. of dimethoxyethane is treated with 0.01 mole of triethylamine with ice-cooling and stirring. After one hour, 0.011 mole of isobutyl chloroformate is added dropwise and the mixture is stirred at 0–5° C. for 4–8 hours. The solution is filtered to remove precipitated triethylamine hydrochloride and evaporated in vacuo to give a concentrated solution of the mixed anhydride.

B. The procedure of Example 21 (A) is followed using equivalent quantities of the following chloroformate esters in place of isobutyl chloroformate to give the corresponding mixed anhydrides: ethyl chloroformate, n-propyl chloroformate, phenyl chloroformate, p-nitrophenyl chloroformate and methyl chloroformate.

C. The procedures of Examples 21 (A) and 21 (B) are followed except that α-[1-(p-chlorophenyl carbamyl)-2-methyl-5-methoxy-3-indolyl]acetic acid and α-[1-(S-phenyl thiocarbonyl)-2-methyl-5-methoxy-3-indolyl]acetic acid, respectively, are used in place of the α-[1-(p-chlorocarbophenoxy) - 2 - methyl-5-methoxy-3-indolyl]acetic acid used therein to yield, respectively, the corresponding mixed anhydrides.

EXAMPLE 21

A. *Preparation of α-[1-(p-chlorocarbophenoxy)-2-methyl-5-methoxy-3-indolyl]-acetyl morpholide*

Equivalent amounts of isobutyric α-[1-(p-chlorocarbophenoxy)-2-methyl-5-methoxy-3-indolyl]acetic acid anhydride and morpholine are reacted at 0–5° C. to give the corresponding α-[1-(p-chlorocarbophenoxy)-2-methyl-5-methoxy-3-indolyl]-acetyl morpholide.

B. The procedure of Example 22 (A) is followed using equivalent quantities of the respective mixed anhydrides of Examples 21 (B) and 21 (C) in place of the mixed anhydride of Example 22 (A) to give the correspondingly substituted morpholides.

C. The procedures of Examples 22 (A) and 22 (B) are followed using equivalent quantities of the following amines in place of morpholine to give the corresponding amides: ammonia, methylamine, isopropylamine, diethanolamine, aniline, methylaniline, benzylamine, p-chloroaniline, β-methoxyethylamine, and p-methoxyaniline. Volatile amines such as ammonia and methylamine are bubbled through the reaction mixture.

EXAMPLE 22

A. *Preparation of diethylaminoethyl α-[1-(p-chlorocarbophenoxy)-2-methyl-5-methoxy-3-indolyl]-acetate*

Equivalent amounts of isobutyric α-[1-(p-chlorocarbophenoxy)-2-methyl-5-methoxy-3-indolyl]acetic acid anhydride and β-diethylaminoethanol are reacted at 0–5° C. to give the corresponding diethylaminoethyl α-[1-(p-chlorocarbophenoxy)-2-methyl-5-methoxy-3-indolyl]-acetate.

B. The procedure of Example 23 (A) is followed using equivalent quantities of the mixed anhydrides prepared in Examples 21 (B) and 21 (C) in place of the mixed anhydride of Example 23 (A) to form the corresponding substituted diethylaminoethyl esters.

I claim:
1. A compound of the structure:

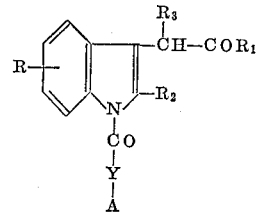

in which

A is selected from the group consisting of phenyl, naphthyl, and substituted phenyl and naphthyl in which the substituents are selected from the group consisting of halogen, lower alkyl, trifluoromethyl, cyano and lower alkylthio;

Y is selected from the group consisting of —O—, —S—, —NH— and —NR$_4$— wherein R$_4$ is selected from the group consisting of lower alkyl and phenyl;

R$_2$ is selected from the group consisting of hydrogen and lower alkyl;

R$_3$ is selected from the group consisting of hydrogen and lower alkyl;

R is selected from the group consisting of halogen, lower alkoxy, lower alkyl, phenyl, di(lower alkyl) amino, nitro, lower alkylthio, trifluoromethyl, lower alkanoylamino, bis(hydroxyethyl)amino, 4'-methyl-1'-piperazinyl, N-morpholino, hydroxy;

$R_1$ is selected from the group consisting of hydroxyl, lower alkoxy, benzyloxy, di(lower alkyl)amino-lower alkoxy, phenylethoxy, $NH_2$, di(lower alkyl)amino, lower alkylamino, bis(hydroxyethyl)amino, anilino, N-lower alkyl anilino, benzylamino, haloanilino, lower alkoxy lower alkylamino, morpholino, lower alkoxyanilino, OX in which X is a cation selected from the group consisting of alkali metals, alkaline earth metals, aluminum, magnesium, morpholinium, tri(lower alkyl)ammonium, alkylammonium, anilinium, cholinium, lower alkylanilinium and piperazinium, and OY in which Y is the structure:

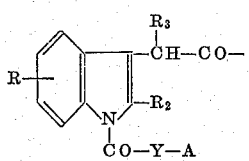

2. The compound of the formula:

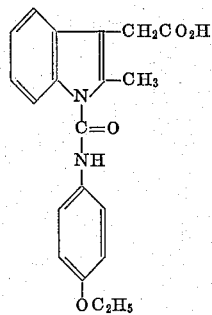

3. The compound of the formula:

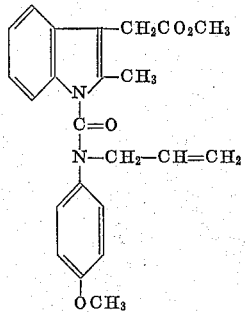

4. The compound of the formula:

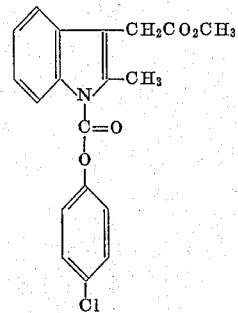

5. The compound of the formula:

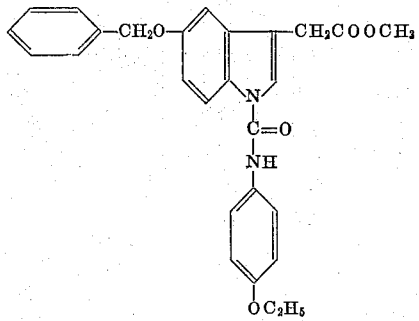

6. The compound of the formula:

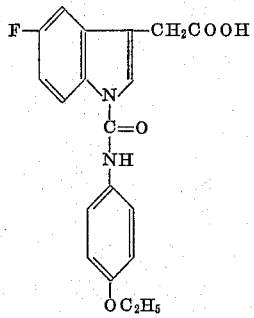

7. The compound of the formula:

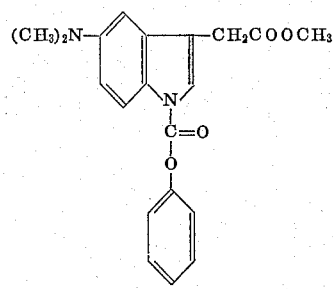

8. The compound of the formula:

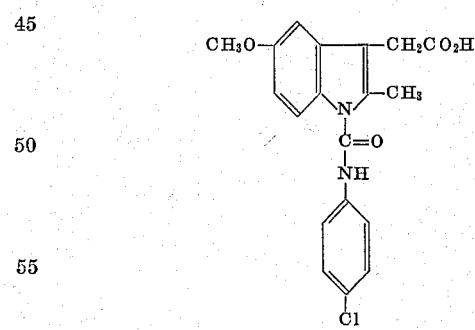

9. The compound of the formula:

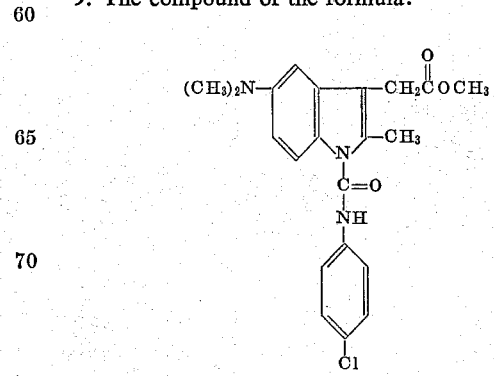

10. The compound of the formula:
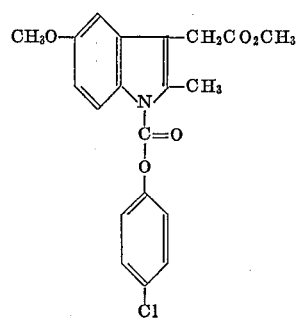
11. The compound of the formula:
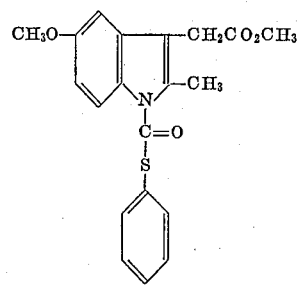
No references cited.
NICHOLAS S. RIZZO, *Primary Examiner.*